Nov. 19, 1946.  H. H. CURRY ET AL  2,411,367
DIESEL ELECTRIC MARINE DRIVE
Original Filed Oct. 16, 1940
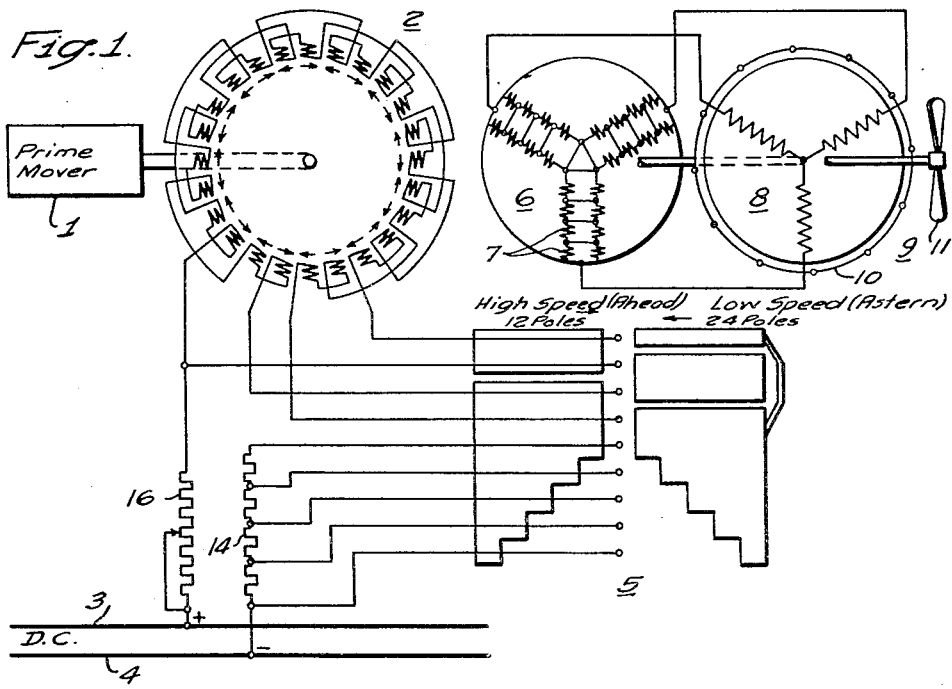
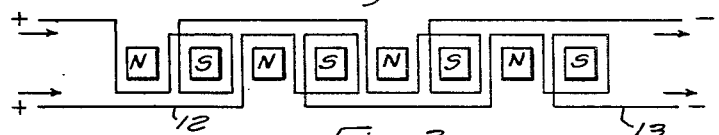
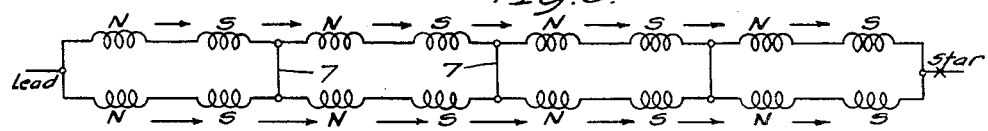
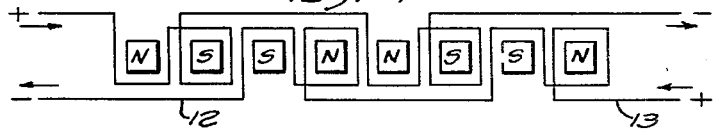
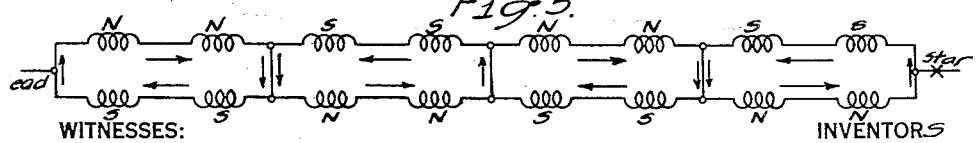
INVENTORS
Herman H. Curry and
Adolphus M. Dudley
BY
Paul E. Friedemann
ATTORNEY Patented Nov. 19, 1946

2,411,367

UNITED STATES PATENT OFFICE 2,411,367

DIESEL ELECTRIC MARINE DRIVE

Herman H. Curry, Montgomery County, Md., and Adolphus M. Dudley, Oakmont, Pa., assignors to Westinghouse Electric Corporation, East Pittsburgh, Pa., a corporation of Pennsylvania Original application October 16, 1940, Serial No. 361,342, now Patent No. 2,275,508, dated March 10, 1942. Divided and this application August 14, 1942, Serial No. 454,802

3 Claims. (Cl. 172—284)

Our invention relates to an electromagnetic coupling of general utility but which coupling is of particular utility for marine propulsion drives.

The present application is a division of our application entitled, Diesel electric marine drives, Serial 361,342, filed October 16, 1940.

One object of our invention is to provide an electrical coupling (also called "electric coupling" and "electromagnetic coupling").

Another object of our invention is to provide an electromagnetic coupling having a salient pole, direct current energized field winding on its driving member and having a phase wound winding on its driven member which is so wound that the phase winding selectively becomes a short-circuited winding or an alternating current generator, depending upon the selection of pole numbers in the salient pole driving member by a pole changing switch, so as to provide direct drive through the electromagnetic coupling in the "ahead" direction in the case of the short-circuited winding or to provide drive at a lower speed in the "astern" direction in the case of the winding acting as a generator when electrically connected to the rotor of an induction motor.

Other objects and advantages will become more apparent from a study of the following specification when considered in conjunction with the accompanying drawing, in which:

Figure 1 is a schematic showing of a marine propulsion drive embodying the principles of our invention;

Fig. 2 is a schematic showing of the salient pole winding on the driving member of the electromagnetic coupling of the member for low speed "astern" operation, that is, for a larger pole number;

Fig. 3 is a diagrammatic showing of the polarity of one of the phase windings on the driven member of the electromagnetic coupling when the driving member is connected, as shown in Fig. 2;

Fig. 4 is a view similar to Fig. 2 but in which two of the leads are reversed in polarity so as to give a lower pole number which is suitable for high speed "ahead" operation; and Fig. 5 is a view similar to Fig. 3 but which corresponds to the connections of the salient pole driving member shown in Fig. 4.

In propulsion drives, many outstanding advantages have been found in the employment of the "Kilgore" type of electromagnetic coupling comprising generally, a salient pole direct current energized driving member and a short-circuited winding or pair of short-circuited double layer windings on the driven member (or vice versa). This type of winding has been disclosed in the copending application of L. A. Kilgore and R. A. Baudry, now Patent No. 2,259,311, issued October 14, 1941, and entitled "Electric couplings." One of the outstanding advantages of such coupling is the elimination of transmission of torsional vibrations through the system. One defect of this type of drive is that the Diesel engine is not readily reversible to effect rotation in the "astern" direction. We have conceived the idea of a special coupling and employing the coupling as a phase wound machine or generator to transmit power to a reversing motor when required, and thus effect ready reversibility of the propeller. By winding the driven member with a specially wound phase winding including equalizing connections, it is possible to employ this phase winding as a generator which will supply electrical energy to an induction motor to drive the propeller in the "astern" direction at relatively low speed for a definite selection of pole numbers on the salient pole driving element and by the mere changing of the number of salient poles by suitable switching means, the phase windings will automatically become short-circuited through their equalizing connections so that the new electromagnetic coupling will act, in effect, as a Kilgore electric or slip coupling. Torque drive in the "ahead" direction is secured by electromagnetic action between the salient pole driving member and the short-circuited driven member which is substantially a direct drive normally having but a small degree of angular lag.

Referring more particularly to the drawing, numeral 1 designates a prime mover such as a Diesel engine which is mechanically coupled to a salient pole field winding 2 which is energized by a suitable source of direct current potential furnished through terminals 3 and 4. A controller 5 is provided for the purpose of changing the number of poles of the salient pole field winding 2. When moved to the right, the controller, by virtue of its left-hand segments will connect the field winding 2 for 12 poles, whereas, when moved to the left, the right-hand segments will provide a connection for 24 poles.

Fig. 2 shows schematically the manner in which the salient pole field winding 2 is wound so as to get alternate north and south poles in the case of the 24 pole connection which corresponds to low speed (astern) operation. Electromagnetically coupled to field winding 2 is a phase wound driven element 6 having a plurality of equalizing leads such as 7. When controller 5 is moved to the left so as to secure the higher number of poles (namely 24 poles) corresponding to the connection shown in Fig. 2, the phase wound winding driven element 6 assumes a polarity indicated in Fig. 3. In this instance, the phase winding 6 will act as a generator and will supply electrical energy to the phase wound rotor winding 8 of an induction motor 9, which induction motor has also a squirrel cage stator 10. Windings 6 and 8 are supported on cores which are rigidly interconnected by a common shaft. The induction motor 9 is so wound that for the higher pole number, as shown in Figs. 2 and 3 (and as indicated by the arrows in Fig. 1), the induction motor drive will be in the "astern" direction with its motive force supplied by the polyphase voltage and power delivered by the phase wound driven member 6. It will be noted that, in this instance, the propeller 11 is driven in a direction opposite to the direction of rotation of the prime mover shaft and its mechanically coupled field winding 2.

On the other hand, if it is desired to drive the ship in the "ahead" direction, controller 5 is moved to the right so as to secure the salient pole winding connection such as indicated in Fig. 4, namely, for a lower number of poles (12 poles). It will be seen that mere reversing of the polarity of the two lower terminals 12 and 13 of Fig. 2 will give the polarities indicated in Fig. 4. The phase winding on the driven element 6 assumes the polarity shown in Fig. 5 wherein, as will be seen by the direction of the arrows indicating current flow, the various groups of windings are short-circuited so that no electric power is generated by the phase wound driven member 6. Since the windings are short-circuited, there is substantially a direct drive between the salient pole field winding 2 and the phase wound driven member 6 due to electromagnetic action. Actually, the electric coupling carries the propeller in the "ahead" direction up to about 99% of the engine speed. The slight difference is due to the necessary electrical slip which introduces torque currents in the internally short-circuited winding or driven element 6. There is no current, voltage or power transmitted to the induction motor 9 on account of the internally short-circuiting of the phase winding on the driven element 6. Resistor 14 in Fig. 1 is divided into portions so as to provide a step-by-step, progressive short-circuiting of serially connected resistance 14, in either "ahead" or "astern" operation, as provided by the symmetrically arranged step-like segment portions on the lower part of the controller 5 as will be readily obvious to those skilled in the art. The resistor 16 is an additional resistance which may be provided if so desired.

We are, of course, aware that others, particularly after having had the benefit of the teachings of our invention, may devise other devices embodying our invention, and we, therefore, do not wish to be limited to the specific showing made in the drawing and the descriptive disclosure hereinbefore made, but wish to be limited only by the scope of the appended claims and such prior art that may be pertinent.

We claim as our invention:

1. An electromagnetic coupling having rotatable driving and driven members one of which comprises a salient pole winding and a pole changing switch between said source and field winding for selectively connecting the field winding for a plurality of pole numbers, the other of said members comprising a phase wound winding including equalizing connections and which is so wound as to become short-circuited by said connections for one of said pole numbers and which will act as an alternating current generator for another of said pole numbers of said salient pole field winding.

2. An electromagnetic coupling having rotatable driving and driven members, the driving member comprising a salient pole field winding, a source of direct current potential for said field winding and a pole changing switch between said source and field winding for selectively connecting the field winding for a pair of pole numbers, the driven member comprising a phase wound winding including equalizing connections and which is so wound as to become short-circuited by said connections for one of said pole numbers and which will act as an alternating current generator for the other of said pole numbers of said salient pole field windings.

3. An electromagnetic coupling having rotatable driving and driven members, the driving member comprising a salient pole field winding, a source of direct current potential for said field winding and a pole changing switch between said source and field winding for selectively connecting the field winding for two groups of pole numbers, the driven member comprising a phase wound winding including equalizing connections and which is so wound as to become short-circuited by said connections for one of said pole numbers and which will act as an alternating current generator for the other of said pole numbers of said salient pole field winding, said pole changing switch including switching means for making the number of poles of one group during alternating current generator action twice the number of poles of the other group that are used during short-circuit action.

HERMAN H. CURRY.
ADOLPHUS M. DUDLEY.